J. E. DELK.
APPARATUS FOR USING AUTOMOBILES AS POWER PLANTS.
APPLICATION FILED DEC. 2, 1915.
1,187,511.
Patented June 20, 1916.
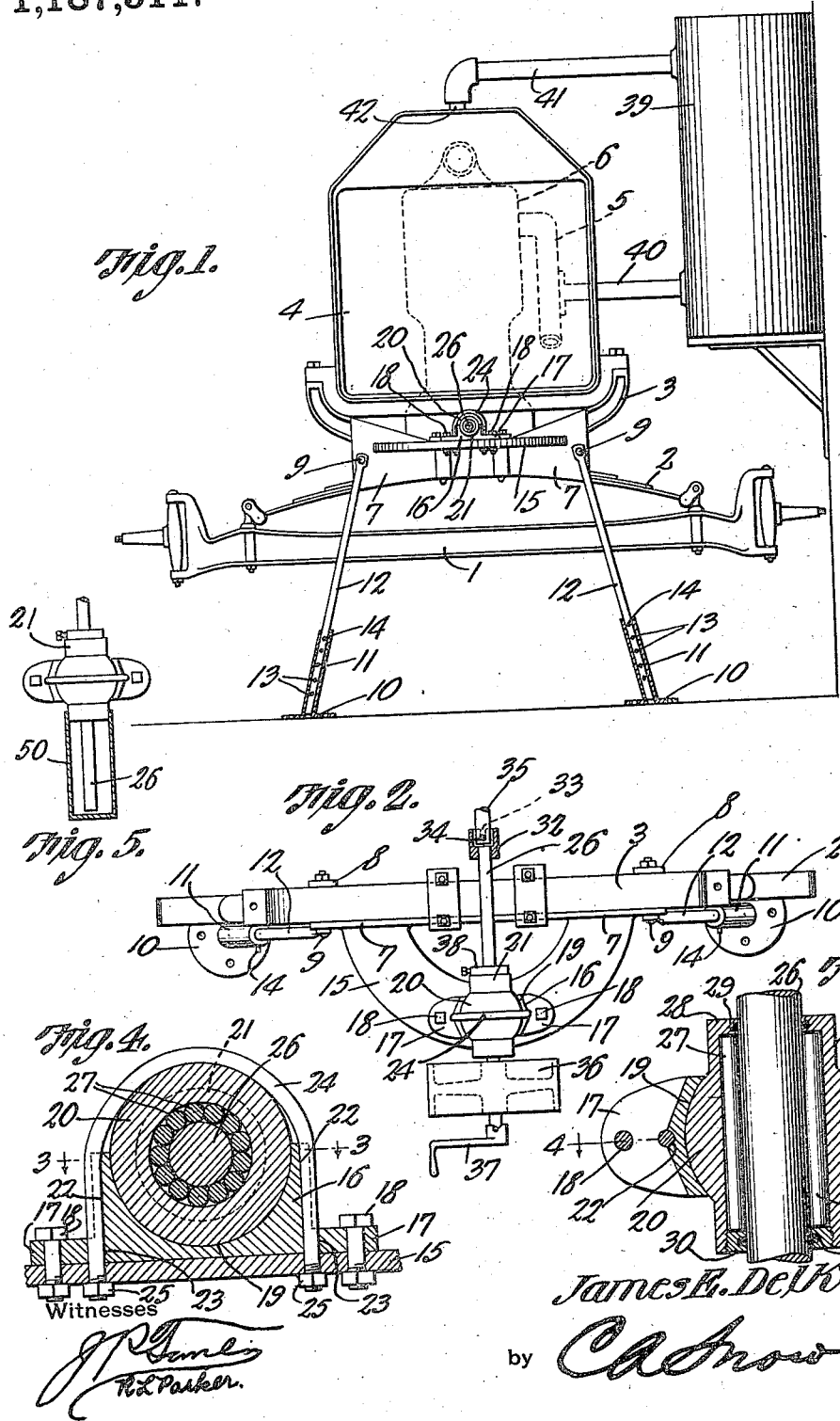

UNITED STATES PATENT OFFICE.

JAMES EVANS DELK, OF MARIETTA, GEORGIA.

APPARATUS FOR USING AUTOMOBILES AS POWER PLANTS.

1,187,511.  Specification of Letters Patent.  Patented June 20, 1916.

Application filed December 2, 1915. Serial No. 64,751.

*To all whom it may concern:*

Be it known that I, JAMES E. DELK, a citizen of the United States, residing at Marietta, in the county of Cobb and State of Georgia, have invented a new and useful Apparatus for Using Automobiles as Power Plants, of which the following is a specification.

The present invention is an apparatus whereby an automobile may be used as a stationary power plant for operating a churn, pump, electric current generator or other machine, whereby the owner or user of an automobile can use the automobile engine for operating various machines, without the necessity of employing a separate stationary engine. The automobile can thus be put to useful purposes, while standing in the garage, or elsewhere.

The present apparatus is of such construction that it can be readily applied to and removed from the automobile, and is comparatively simple and inexpensive in construction.

It is the object of the invention to provide an apparatus of the nature indicated which is improved generally in its construction and details to enhance the utility and efficiency thereof, the apparatus enabling the machine which is to be operated to be actuated directly from the automobile engine and not through the intervention of the transmission mechanism of the vehicle.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is a front end view of an automobile with the apparatus applied. Fig. 2 is an enlarged plan view of the apparatus as applied. Fig. 3 is an enlarged horizontal section of the adjustable bearing taken on the line 3—3 of Fig. 4. Fig. 4 is a vertical section of the bearing taken on the line 4—4 of Fig. 3. Fig. 5 is a sectional view illustrating a cap for protecting the shaft.

As illustrated, the apparatus is applied to a Ford automobile, although it is to be understood that the apparatus can be employed with various other automobiles, suitable changes being made when necessary.

The automobile illustrated embodies a front axle 1 upon which is secured the semi-elliptical spring having its intermediate portion clamped to the yoke or cross piece 3 at the forward end of the frame or chassis. The radiator 4 is disposed above the yoke 3, and is connected by a return pipe 5 with the water jackets 6 of the engine.

To attach the apparatus to the automobile, two front plates 7 rest against the yoke 3 and spring 2 at the opposite sides of the central portions thereof, and plates or bars 8 rest against the rear sides of the spring and yoke opposite the plates 7. Bolts or other clamping elements 9 are engaged through the plates 7 and 8 between the spring 2 and yoke 3, and clamp said plates to the spring and yoke.

The forward end of the automobile is preferably supported by a pair of legs embodying the feet or base plates 10 to be seated or secured upon the floor or base and having upwardly projecting tubular leg sections 11 into which are telescoped the upper leg sections 12. The upper ends of the sections or rods 12 have eyes embracing the bolts 9, whereby said bolts not only serve to clamp the plates 7—8 to the automobile, but also attach the legs thereto. The rods 12 are provided with a longitudinal series of apertures 13 adjacent their lower ends, and pins or other elements 14 are insertible through the tubular sections 11 and apertures 13 for adjustably supporting the rods 12, the legs being adjustable to various heights for properly supporting the forward end of the automobile.

A semi-circular bracket 15 is terminally secured to the plates 7, and projects forwardly, and an adjustable bearing is carried by the intermediate portion of the bracket 15. This bearing embodies a pillow block 16 seated upon the bracket 15 and having at its opposite sides lower outstanding ears 17 bolted, as at 18, upon the bracket 15. The pillow block 16 is provided with an upper depression or recess 19 having a spherical surface in which is seated the spherical enlargement 20 of a sleeve or bearing 21. The enlargement 20 is disposed intermediate the ends of the sleeve 21, and the ends of said sleeve project forwardly and rearwardly from the block 16. The enlargement 20 is seated in the depression 19 and enables the sleeve 21 to be adjusted to various angles within certain limits.

The opposite sides of the block 16 are provided with vertical grooves 22 and with apertures 23 at the lower ends of said grooves, and a U-shaped rod or bolt 24 straddles the enlargement 20 and has its limbs seated within the grooves 22 and extending through the apertures 23 and bracket 15. Nuts 25 are threaded upon the ends of the rod 24 to draw the same downwardly, whereby the intermediate portion of the rod 24 in seating upon the enlargement 20 will clamp said enlargement upon the pillow block 16.

A shaft 26 is journaled through the sleeve 21, and an annular series of anti-frictional rollers 27 are disposed between the shaft 26 and sleeve 21 whereby the shaft rotates easily. The rear end of the sleeve 21 has an inturned annular flange 28 provided with an annular groove 29 receiving packing which embraces the shaft 26, and a ring or annulus 30 is threaded into the forward end of the sleeve 21 and has an annular groove 31 receiving packing embracing said shaft, whereby the packings will retain the lubricant within the sleeve 21.

Before the apparatus is applied to the automobile, the starting crank is detached, so that the shaft 26 can be connected directly to the forward end of the crank shaft 35 of the engine. To effect this connection, the rear end of the shaft 26 has attached thereto a socket member 32 for receiving the forward end of the crank shaft 35, and provided with notches 33 for receiving the clutch pin 34 of the crank shaft 35, whereby the shaft 26 is connected by a universal joint with the crank shaft 35. When the device is applied, the socket member 32 can be readily slipped rearwardly upon the crank shaft 35 and pin 34, and the pin 34 in engaging within the notches 33 will rotate the shaft 26 with the crank shaft 35, although the shaft 26 is not strictly in alinement with the crank shaft.

A pulley wheel 36 is mounted upon the shaft 26 in front of the bearing, and a starting crank 37 is carried by the forward end of the shaft 26. A collar 38 is preferably secured upon the shaft 26 to bear against the rear end of the sleeve 21 for holding the shaft 26 in place relative to the bearing, the hub of the pulley wheel 36 bearing against the forward end of the sleeve 21.

In order to provide supplemental means for cooling the water flowing between the water jackets and radiator, a secondary cooling tank 39 is provided, the same being connected adjacent its lower end by a pipe 40 with the return pipe 5, and a pipe 41 connecting the tank 39 adjacent its upper end with the upper filling spout or nipple 42 of the radiator 4. The hot water will flow from the radiator 4 through the pipe 41 into the tank 39, and as the water is cooled in said tank the cool water will flow through the pipe 40 into the return pipe 5 and water jackets 6. The tank 39 thus coöperates with the radiator for effectively cooling the engine although the engine is put to hard and continued use.

In applying the apparatus, the shaft 26 is connected to the crank shaft 35 before the rod 24 is tightened, in order that the sleeve 21 can swing with the shaft 26. Then when the parts are in position, the nuts 25 are tightened to hold the sleeve 21 in fixed position, although the rod 24 may be left slightly loose to allow the sleeve 21 to vibrate if necessary. When the engine is operated, the power is transmitted directly to the shaft 26, and the pulley wheel 36 may be belted to the machine which is to be operated, thereby operating said machine directly from the engine without the intervention of the transmission mechanism of the automobile. The full power of the engine is thus derived.

If desired, a suitable governor can be used for regulating the speed of the engine, and any suitable clutch device can be employed for connecting and disconnecting the pulley wheel 36 relative to the shaft 26.

The present apparatus enables the owner or user of an automobile to use the automobile as a stationary power plant, thereby furthering the utility of the automobile.

In Fig. 5, there is illustrated a cap 50 adapted to be slipped onto the outer end of the sleeve 21 for protecting the outer end of the shaft 26 when the pulley wheel and crank are removed therefrom.

Having thus described the invention, what is claimed as new is:

1. An apparatus of the character described, embodying a pair of plates, a pair of rear plates, bolts engaged through the plates to clamp them to the forward end of an automobile, a pair of adjustable legs engaged with said bolts, an arcuate forwardly projecting bracket terminally attached to the first mentioned plates, a bearing upon the intermediate portion of said bracket, and a shaft journaled through said bearing and having means at its rear end for connection with the crank shaft of an automobile engine.

2. An apparatus of the character described, comprising a bracket attachable to the forward end of an automobile, a pillow block secured upon said bracket and having a depression, a sleeve having a spherical enlargement seated in said depression, a shaft journaled through said sleeve and having means at its rear end for connection with an automobile crank shaft, a U-shaped rod straddling said enlargement and engaged through the pillow block, and nuts threaded upon the ends of said rod for clamping said enlargement between the rod and pillow block.

3. An apparatus of the character described, comprising a semi-circular bracket having means at its ends for attaching it to the forward end of an automobile, a pillow block secured upon the intermediate portion of said bracket and having a depression, opposite vertical grooves and apertures at the lower ends of said grooves, a sleeve having a spherical enlargement between its ends seated in said depression, a shaft journaled through said sleeve and having means at its rear end for connection with the crank shaft of an automobile engine, a U-shaped rod straddling said enlargement, seated in said grooves and projecting downwardly through said apertures and brackets, and nuts threaded upon the ends of said rod and seating against the bracket.

In testimony that I claim the foregoing as my own, I have hereto affixed my signature in the presence of two witnesses.

JAMES EVANS DELK.

Witnesses:
W. A. SAMS,
LEN C. BREEDIN.